US012729121B2

(12) United States Patent
Saner Okan et al.

(10) Patent No.: US 12,729,121 B2
(45) Date of Patent: Sep. 8, 2026

(54) METHOD FOR GROWING 2D/3D CARBON-BASED NANO- AND SUBMICRON-SIZED STRUCTURES

(71) Applicant: SABANCI UNIVERSITESI, Istanbul (TR)

(72) Inventors: Burcu Saner Okan, Istanbul (TR); Yusuf Ziya Menceloglu, Istanbul (TR)

(73) Assignee: SABANCI UNIVERSITESI, Istanbul (TR)

( * ) Notice: Subject to any disclaimer, the term of this patent is extended or adjusted under 35 U.S.C. 154(b) by 449 days.

(21) Appl. No.: 18/294,549

(22) PCT Filed: Aug. 10, 2021

(86) PCT No.: PCT/TR2021/050785
§ 371 (c)(1),
(2) Date: Feb. 2, 2024

(87) PCT Pub. No.: WO2023/018386
PCT Pub. Date: Feb. 16, 2023

(65) Prior Publication Data

US 2025/0100883 A1 Mar. 27, 2025

(51) Int. Cl.
*C01B 32/05* (2017.01)

(52) U.S. Cl.
CPC .................................... *C01B 32/05* (2017.08)

(58) Field of Classification Search
CPC ..... C01B 32/158; C01B 32/159; C01B 32/16; C01B 32/162; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01B 32/182; C01B 32/184; C01B 32/186; C01B 32/188; C01B 32/19; C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01B 32/15; C01B 32/18; C01B 32/152; C01B 32/154; C01B 32/156; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

PUBLICATIONS

Jiang, et al., Polypropylene as a carbon source for the synthesis of multi-walled carbon nanotubes via catalytic combustion, Carbon 2007; 45: 449-458 (Year: 2007).*

Kocanali, Upcycling to Sustainable Conversion of Polypropylene Waste to Graphene Grown Talc Hybrids as Additive for Efficient Thermoplastic Processing and its Systematic Life Cycle Assessment, Thesis Sabanci University, pp. 1-97 (Dec. 2021) (Year: 2021).*

Mahardika Prasetya Aji, et al., Polymer carbon dots from plastics waste upcycling, Environmental Nanotechnology, Monitoring & Management, 2018, pp. 136-140, vol. 9.

Ganesh Bajad, et al., Conversion of plastic waste into CNTs using Ni/ Mo/MgO catalyst—An optimization approach by mixture experiment, Fullerenes, Nanotubes and Carbon Nanostructures, 2015, pp. 1-32.

Dalsu Choi, et al., High Performance Graphitic Carbon from Waste Polyethylene: Thermal Oxidation as a Stabilization Pathway Revisited, Chemistry of Materials, 2017, pp. 9518-9527, vol. 29.

Jiang Gong, et al., Upcycling Waste Polypropylene into Graphene Flakes on Organically Modified Montmorillonite, Industrial & Engineering Chemistry Research, 2014, pp. 4173-4181, vol. 53.

Zdralkova Jana, et al., Talc Properties After Acid Treatment and Mechanical Procedures, NANOCON, 2013.

Zhiwei Jiang, et al., Polypropylene as a carbon source for the synthesis of multi-walled carbon nanotubes via catalytic combustion, Carbon, 2007, pp. 449-458, vol. 45.

Jie Liu, et al., Catalytic pyrolysis of polypropylene to synthesize carbon nanotubes and hydrogen through a two-stage process, Polymer Degradation and Stability, 2011, pp. 1711-1719, vol. 96.

Siti Shuhadah MD. Saleh, et al., Effect of Catalyst Calcination Temperature on the Synthesis of MWCNTs-talc Hybrid Compound Using CVD Method, Key Engineering Materials, 2014, pp. 63-67, vols. 594-595.

(Continued)

*Primary Examiner* — Daniel C. Mccracken
(74) *Attorney, Agent, or Firm* — Bayramoglu Law Offices LLC

(57) ABSTRACT

A selective method for obtaining carbon-based two-dimensional and/or three-dimensional nano- or submicron-sized structures, including the following consecutive steps of selecting a suitable talc size, activating a surface of talc, thereby obtaining an activated surface; bringing the activated surface into contact with one or more polymers; and pyrolysis and/or carbonization of the polymers when in contact with the activated surface is provided. Depending on the aromaticity of polymers, growing 3D graphene structures may be initiated on the talc surface. The surface of the talc is activated with an activator selected from a list that includes carboxylic acids, metal salts and metal oxides. A hybrid additive which can be defined as talc provided with one or more carbon-based two and/or three-dimensional nano- or submicron-sized structures provided thereon is also provided.

19 Claims, No Drawings

(56) References Cited

PUBLICATIONS

Linfan Cui, et al., Trash to treasure: converting plastic waste into a useful graphene foil, Nanoscale, 2017, pp. 9089-9094, vol. 9.
Rongjun Song, et al., The Combined Catalytic Action of Solid Acids with Nickel for the Transformation of Polypropylene into Carbon Nanotubes by Pyrolysis, Chemistry A European Journal, 2007, pp. 3234-3240, vol. 13.
Chuanwei Zhuo, et al., Upcycling Waste Plastics into Carbon Nanomaterials: A Review, Journal of Applied Polymer Science, 2014, pp. 39931(1-14).
Xiaohong An, et al., Stable Aqueous Dispersions of Noncovalently Functionalized Graphene from Graphite and their Multifunctional High-Performance Applications, Nano Letters, 2010, pp. 4295-4301, vol. 10.
Zhenhai Wen, et al., Crumpled Nitrogen-Doped Graphene Nanosheets with Ultrahigh Pore Volume for High-Performance Supercapacitor, Advanced Materials, 2012, pp. 1-7.

* cited by examiner

METHOD FOR GROWING 2D/3D CARBON-BASED NANO- AND SUBMICRON-SIZED STRUCTURES

CROSS REFERENCE TO THE RELATED APPLICATION

This application is the national phase entry of International Application No. PCT/TR2021/050785, filed on Aug. 10, 2021, the entire contents of which is incorporated herein by reference.

TECHNICAL FIELD

The present invention relates to a method for upcycling of waste plastics. The present invention particularly relates to selectively growing carbon-based 2D and 3D nano-sized and/or submicron-sized structures on talc surface and a resulting, hybrid additive for use as a reinforcement material in composite structures.

BACKGROUND

Waste plastic management is a growing problem. Inexpensive feedstocks yielded from plastic chemical recycling enable a new pathway to manufacture some value-added products. This process is then being termed "upcycling" process, as the quality/value of the final products is upgraded. For instance, it is possible to synthesize CNTs, graphene or other carbonaceous products from plastic waste materials [Aji, M. P., et al., *Polymer carbon dots from plastics waste upcycling*. Environmental Nanotechnology, Monitoring & Management, 2018. 9: p. 136-140] [Zhuo, C. and Y. A. Levendis, *Upcycling waste plastics into carbon nanomaterials: A review*. Journal of Applied Polymer Science, 2014. 131 (4)].

There are some attempts for growing carbon structures on organically modified montmorillonite (OMMT) and zeolites.

In one of the studies, Gong et al. [Gong, J., et al., *Upcycling waste polypropylene into graphene flakes on organically modified montmorillonite*. Industrial & Engineering Chemistry Research, 2014. 53 (11): p. 4173-4181] used waste PP (polypropylene) as raw material catalyzed by OMMT to realize highly yielding graphene flakes (GFs). As described in said study, a uniform mixture containing PP (~89 wt. %), talcum (~11 wt. %) and OMMT (in a trace quantity) were placed in a crucible. The mixture was heated up to 700° C. for 15 min to obtain a carbonized char, which was then immersed in HF and $HNO_3$ after cooling. Impurities (e.g. Montmorrillonite and talcum additives) were dissolved by HF, and amorphous carbon was oxidized by $HNO_3$. GFs were obtained after repeatedly centrifuging and isolating from the solution. This process does not result in formation of carbon-based three-dimensional nano- or submicron sized structures.

In another study, Cui et al. [Cui, L., et al., *Trash to treasure: converting plastic waste into a useful graphene foil*. Nanoscale, 2017. 9 (26): p. 9089-9094] represented a solid-state chemical vapor deposition (CVD) method for converting plastic wastes into valuable graphene foils with high quality, less defects and with an electrical conductivity much higher than that of common free-standing graphene films treated at ultrahigh temperatures. This flexible GFs have a proper structure and are functional for producing an anode for the fabrication of foldable Lithium-Ion Batteries (LIBs). The strategy of generating high-quality free-standing GFs from plastic wastes indeed provides a trash-to-treasure way for graphene production by top-down approach and practical applications.

Moreover, Jiang et al. [Jiang, Z., et al., *Polypropylene as a carbon source for the synthesis of multi-walled carbon nanotubes via catalytic combustion*. Carbon, 2007. 45 (2): p. 449-458] mixed melted polypropylene with a catalyst, and then heated the mixture to a temperature of 830° C. to obtain CNTs. PP/OMMT/nickel compound mixtures were combusted to synthesize multi-walled carbon nanotubes (MWCNTs). In this process, different nickel compounds acted as catalyst to synthesize MWCNTs in the presence of OMMT. The combustion temperature, the types and contents of the nickel catalysts and OMMT had effects on the yield of MWCNTs. In the respective method, heat was gradually transferred from the surface to the core of the samples, meanwhile the degradation products of PP diffused in a reverse direction relative to the heat transfer and a part of said degradation products were catalyzed to form MWCNTs and hydrogen due to the presence of the degraded OMMT and Ni catalyst. Herein, MWCNT were produced by replacing cations in the interlayer of montmorillonite (MMT) with cationic surfactants (such as alkyl ammonium).

As a degradation pathway for plastics, Choi et al. [Choi, D., et al., *High performance graphitic carbon from waste polyethylene: thermal oxidation as a stabilization pathway revisited*. Chemistry of Materials, 2017. 29 (21): p. 9518-9527] successfully converted linear low density polyethylene (LLDPE) (which is inherently "noncarbonizable") into an ordered carbon by using thermal oxidation. Also, the conversion yield at this transformation reached to 50%. The graphitized LLDPE based carbon has an exceptional electrical performance, which makes it an applicable material for lithium-ion battery fabrication.

In another work, Song et al. [Song, R., et al., *The combined catalytic action of solid acids with nickel for the transformation of polypropylene into carbon nanotubes by pyrolysis*. Chemistry—A European Journal, 2007. 13 (11): p. 3234-3240] investigated the effects of both organically modified montmorillonite (OMMT) and $Ni_2O_3$ on the carbonization of polypropylene during pyrolysis process. The catalyst H-MMT (montmorillonite (MMT) that contains hydrogen protons) have an important influence on the degradation and the carbonization behavior of PP and also the formation of multiwalled carbon nanotubes (MWCNTs). The higher yields of MWCNTs obtained by combination of OMMT and the nickel catalyst during pyrolysis process due to the acidic sites upon the H-MMT layers and the metallic Ni formed in situ from the reduction of $Ni_2O_3$ during the transformation of PP into MWCNTs. The presence of carbenium ions as intermediates in the catalytic degradation of PP promotes the formation of MWCNTs from the degradation products as carbon sources, especially those with higher carbon content.

Liu et al. [Liu, J., et al., *Catalytic pyrolysis of polypropylene to synthesize carbon nanotubes and hydrogen through a two-stage process*. Polymer degradation and stability, 2011. 96 (10): p. 1711-1719] provided a potential way to convert waste plastics into carbon nanomaterials and hydrogen by demonstrating a newly developed process to continuously convert PP to hydrogen and carbon materials. HZSM-5 zeolite and NiO were used as catalysts in a screw kiln reactor for degrading PP and a moving-bed reactor for decomposing the pyrolysis gas separately. The highest yield of MWCNTs obtained at the decomposition temperature of 700° C. The graphitization degree and thermal stability of the MWCNTs synthesized at high decomposition temperature were higher than those at low decomposition temperatures.

Bajad et al. [Bajad, G., et al., *Conversion of plastic waste into CNTs using Ni/Mo/MgO catalyst—An optimization approach by mixture experiment*. Fullerenes, Nanotubes and Carbon Nanostructures, 2016. 24 (2): p. 162-169] studied synthesis of carbon nanotubes (CNTs) from waste plastic by a combustion technique and using Ni/Mo/MgO as a catalyst. The amount of obtained carbon product measured the catalytic activity of three components Ni, Mo, MgO. The activity of the components is observed to be interdependent, and the component Ni is found to be more effective.

OBJECTS OF THE INVENTION

Primary object of the present invention is to eliminate the drawbacks in the prior art.

Another object of the present invention is to propose a method in which carbon-based nano- and submicron sized structures can be grown on an activated talc surface. Another object of the present invention is to propose a method which eliminates graphene aggregation in polymer processing, thereby enabling an advantageous usage of a hybrid additive.

Another object of the present invention is to propose a method to obtain such hybrid additive.

Another object of the present invention is to propose a low-cost and mild process for obtaining carbon-based two-dimensional and/or three-dimensional nano- or submicron-sized structures.

Another object of the present invention is to propose a low-density hybrid additive which provides a high mechanical strength to composites when introduced as a reinforcement material.

SUMMARY OF THE INVENTION

The present invention proposes a method for obtaining carbon-based two-dimensional and/or three-dimensional nano- or submicron-sized structures, comprising the following consecutive steps of activating a surface of talc, thereby obtaining an activated surface; bringing the activated surface into contact with one or more polymers; and pyrolysis and/or carbonization of the polymers when in contact with the activated surface.

The surface of the talc is activated with an activator selected from the list consisting of carboxylic acids, metal salts and metal oxides.

The present invention further proposes a hybrid additive which can be defined as talc provided with one or more carbon-based two and/or three-dimensional nano- or submicron-sized structures provided thereon.

DETAILED DESCRIPTION OF THE EMBODIMENTS

The present invention for the first time enables the growth of carbon-based 2D nano-sized or submicron sized structures such as graphene and/or 3D nano-sized or submicron sized structures such as fullerene (or fullerene-like structures) on talc and modified talc by changing polymer sources and applying feasible surface activation and carbonization process.

The present invention proposes a method for growing carbon-based two-dimensional and/or three-dimensional nano- or submicron-sized structures on talc. The method comprises the following consecutive steps of:

a) activating a surface of talc, thereby obtaining an activated surface;
b) bringing the activated surface into contact with one or more polymers; and
c) pyrolysis and/or carbonization of the polymers when in contact with the activated surface.

The surface activation of talc in step a can be performed by contacting the talc surface with an activator, which can be one or more carboxylic acids (e.g., oxalic acid) and/or one or more metal salts (e.g., $FeCl_3$) and/or one or more metal oxides (e.g., $Fe_2O_3$). In the case where the talc surface is activated using one or more carboxylic acids, the talc surface will be provided with a plurality of Bronsted acid locations. Thus, in the step a, the surface of the talc is activated with an activator selected from the list consisting of carboxylic acids (e.g., oxalic acid), metal salts (e.g., $FeCl_3$) and metal oxides (e.g., $Fe_2O_3$).

In a preferred version of the method, in the step a, the surface of the talc is activated with an activator selected from metal salts and metal oxides. This measure increases the selectivity of three-dimensional nano- or submicron-sized structures.

In a preferred version of the method, the surface of the talc is activated with an activator selected from metal oxides. This measure further increases the selectivity of three-dimensional nano- or submicron-sized structures.

In the step b, the bringing of the activated surface into contact with one or more polymers can be performed via solution mixing, melt mixing such as extrusion or high shear melt mixing.

In the step c, the one or more polymers are converted into vapor phase, and bind to talc surface as a carbon source for growing of the carbon-based 2D and/or 3D nano-sized or submicron sized structures such as graphene and fullerene.

Polymer backbones lacking carbon rings with $sp^2$ hybridization (e.g., aromatic rings) increase the selectivity of carbon-based two-dimensional nanostructures. Examples to such polymers include polypropylene, polyethylene, non-aromatic polyamides (e.g., nylon 6, nylon 66), polylactide, polyglycolide and poly(ε-caprolactone) or polycaprolactone.

Within the context of the present application, polymers which include carbon rings with $sp^2$ hybridization are considered as polymers with aromatic rings, or as aromatic polymers. The presence of aromatic rings in the one or more polymers increase the selectivity of carbon-based three-dimensional nanostructures; thus the one or more polymers preferably include aromatic rings. Examples to such polymers include polystyrene, polyethylene terephthalate, polyethersulphone, polyether ketone, polyether ether ketone and polyphenylenes. Hence, the one or more polymers are preferably selected from a list consisting of polystyrene, polyethylene terephthalate, polyethersulphone, polyether ketone, polyether ether ketone, polyphenylenes and mixtures thereof.

It is already stated that the selectivity of carbon-based three-dimensional nano- or submicron-sized structures over that of two-dimensional structures is increased by the presence of aromatic rings in the one or more polymers. For polystyrene as an example, for each repeating unit, 6/8 of the number of carbon atoms and 5/8 of hydrogen atoms are located in respective aromatic rings; which corresponds to one mol of aromatic rings per 104 grams of polystyrene, or six moles of sp2 hybridized carbon atoms per 104 grams of polystyrene. It is envisaged that a significant selectivity for three-dimensional nano- or submicron-sized structures is available in the preferred case where the one or more polymers contains 0.2 mol or more aromatic rings per 100 g of said one or more polymers. In other words, each 100 grams of the one or more polymers preferably comprises 0.2 mol or more aromatic rings. Alternatively, the one or more polymers contain 1 mol or more of sp2 hybridized carbon atoms per 100 g of said one or more polymers. The selectivity advantage applies to the case where the one or more polymers is obtained by mixing different polymers; and furthermore, the use of waste plastics as said one or more polymers as carbon source decreases the overall costs of the process. In the preferred case where the one or more polymers are obtained from plastic wastes, for instance as a mixture of waste plastics, an upcycling of said waste plastics is availed. In other words, waste plastics can be employed as one or more polymers as a carbon source for forming carbon-based two and/or three-dimensional nano- or submicron-sized structures within the context of the present invention.

The method according to the present invention enables an easy and low-cost obtainment of carbon-based two-dimensional and/or three-dimensional nano- or submicron-sized structures. The step c directly results in formation of the following product which is also within the scope of the present application: talc provided with one or more carbon-based two and/or three-dimensional nano- or submicron-sized structures provided thereon.

Upon separation of talc and one or more carbon-based two and/or three-dimensional nano- or submicron-sized structures provided thereon, the carbon-based two and/or three-dimensional nano- or submicron-sized structures can be obtained in a purified form. Thus, in a preferred version of the method according to the present invention, the step c is followed by separation of the talc from the carbon-based two-dimensional and/or three-dimensional nanostructures, preferably by dissolving the talc in a solution of one or more strong inorganic acids. An example to strong inorganic acids is nitric acid and hydrogen fluoride (HF). As a result, the carbon-based 2D and/or 3D structures are separated from talc, thereby being purified for confirmation of the structural features and quality of carbon-based two-dimensional and/or three-dimensional nanostructures.

In a preferred version of the method according to the present invention, the pyrolysis and/or carbonization in the step c is performed at a pyrolysis and/or carbonization temperature of at least 850° C. This measure increases the selectivity of two-dimensional and/or three-dimensional nano- or submicron-sized structures over char that could be formed from the carbon source. In a more preferred version of the method according to the present invention, the pyrolysis and/or carbonization in the step c is performed at a pyrolysis and/or carbonization temperature of at least 1000° C. This measure further increases the selectivity of carbon-based two-dimensional and/or three-dimensional nano- or submicron-sized structures over char.

At transition from step b to step c, higher temperature increasing ratios or heating "ramp" rates results in an enhanced selectivity of two-dimensional and/or three-dimensional nano- or submicron-sized structures over char. For instance, in the case where a carbonization or pyrolysis temperature of 1000° C. is reached at the end of a heating duration of 1.5 hours, said selectivity is more acceptable when compared with a heating duration of 4 hours. Hence, a temperature ramp rate of at least 10° C. per minute is preferably applied to reach the pyrolysis and/or carbonization temperature.

It is observed that the selectivity of carbon-based three-dimensional nano- or submicron-sized structures is increased with smaller particle sizes of talc:

- The talc can be arranged to have a $D_{50}$ particle size of up to 10 micrometers, for an enhanced performance in serving as a substrate to the carbon-based two-dimensional nano- or submicron-sized structures.
- In the case where the talc is arranged to have a $D_{50}$ particle size within the range between 2 and 10 micrometers, selectivity of carbon-based three-dimensional nano- or submicron-sized structures is increased with regard to the selectivity of carbon-based two-dimensional nano- or submicron-sized structures; yet carbon-based two-dimensional nano- or submicron-sized structures form as well.
- In the case where the talc is arranged to have a $D_{50}$ particle size of up to 2 micrometers, selectivity of carbon-based three-dimensional nano- or submicron-sized structures is increased with regard to the selectivity of carbon-based two-dimensional nano- or submicron-sized structures.

Within the context of the present application, the term "particle size" can be considered to correspond to a mean or average particle size, which can be determined by a particle size analysis or particle size measurement method used in the related art.

It is observed that higher carbon content in said one or more polymers increases the selectivity of carbon-based two-dimensional and/or three-dimensional nano- or submicron-sized structures over char. Accordingly, the carbon atoms content in the one or more polymers is preferably 65 wt. % or higher, more preferably 80 wt. % or higher, even more preferably 85 wt. % or higher based on the total weight of said one or more polymers. Major commercial polymers with relatively high carbon contents include polyethylene, polypropylene, polystyrene, polyethylene terephthalate and polyacrylonitrile. Within the context of the present application, the term "carbon content" refers to weight percentage of carbon atoms on the basis of the total weight of a respective polymer.

The method according to the present invention enables an easy and low-cost obtainment of carbon-based two-dimensional and/or three-dimensional nano- or submicron-sized structures. The step c directly results in formation of the following product which is also within the scope of the present application: talc provided with one or more carbon-based two and/or three-dimensional nano- or submicron-sized structures provided thereon.

For confirmation of the structural features and quality of the carbon-based two- and/or three-dimensional nano- or submicron-sized structures; the talc and the one or more carbon-based two and/or three-dimensional nano- or submicron-sized structures provided thereon can be separated from each other, and thus, the carbon-based two and/or three-dimensional nano- or submicron-sized structures can be obtained in a purified form.

The carbon-based two-dimensional nano- or submicron sized structures can be exemplified over graphene; and the carbon-based three-dimensional nano- or submicron sized structures can be exemplified over fullerene. Talc provided with one or more carbon-based two and/or three-dimensional nano- or submicron-sized structures provided thereon, can be considered as a hybrid additive. The hybrid additive has a much lower density when compared to "neat" talc (i.e., talc which is not provided with carbon-based two-dimensional nano- or submicron sized structures).

The hybrid additive can be considered as an advantageous alternative to fine, neat talc used in high-cost applications. For achieving the mechanical performance availed by the hybrid additive as a reinforcement material, a composite structure can include a low extent of the hybrid additive, such as 10 wt. % or even as low as 2 wt. % on the basis of the total weight of the composite structure. It is observed that the mechanical performance of an exemplary composite structure that is reinforced with (on the basis of the total weight of the composite structure) 5 wt. % of talc having surfaces provided with the carbon-based two- and/or three-dimensional nano- or submicron-sized structures according to the present invention, is higher than a comparative composite structure that is reinforced with 15 wt. % of neat talc, on the basis of the total weight of the respective composite structure. PP-copo (i.e., polypropylene copolymer, copolymer polypropylene, copo PP or cPP) was used as a polymer matrix in both of the composite structures, one being reinforced with neat talc, the other being reinforced with the carbon-based two- and/or three-dimensional nano- or submicron-sized structures according to the present invention. It is envisaged that the mechanical performance advantage of the carbon-based two- and/or three-dimensional nano- or submicron-sized structures according to the present invention as a reinforcement material applies to any other polymer matrix material as well. Hence, the present invention further proposes a polymer matrix reinforced with the hybrid additive, that is, talc having one or more surfaces provided with one or more carbon-based two- and/or three-dimensional nano- or submicron-sized structures.

The hybrid additive can be used as a reinforcement in thermoplastic compounding since can be used as a filler in commodity products. The hybrid additive will be a highly preferable alternative to fine and ultrafine neat talc that is widely used in automotive, white goods, and commodity applications. Micron scale talc has the disadvantages of producing a high amount of waste and having a high density which is not preferred especially in automotive and white goods industries. Neat talc particle size that is lower than micron scale increases costs to an undesirable extent, in particular when employed in commodity industries. The present invention eliminates all of said disadvantages of neat talc, by enabling the obtainment of talc provided with one or more carbon-based two and/or three-dimensional nano- or submicron-sized structures provided thereon.

The present invention enables a robust, reliable, cost-effective and fast process capable of fulfilling all requirements for large volume production of carbon-based two-dimensional and/or three-dimensional nano- or submicron-sized structures, such as functional graphene.

The method according to the present invention is scalable: it can be performed using a small reactor such as a laboratory furnace, as well as in a greater scale reactor such as a pyrolysis system having a capacity of 1500 kg waste working under inert atmosphere, without any added extent of complexity. In the method according to the present invention, the surface activation of talc does not require the use of strong inorganic acids; thus the present invention proposes a mild process.

The present invention prevents graphene agglomeration, since the carbon-based 2D and/or 3D nano-sized or submicron sized structures are grown on the talc as substrate; this will also open an ease to compounding process with thermoplastic polymers. The method eliminates the use of toxic chemicals such as acid mixtures and oxidizing agents in production of carbon-based 2D and/or 3D nano-sized or submicron sized structures and in separation of the same from the substrate.

The enablement of use of waste plastics in obtainment of carbon-based 2D and/or 3D nano-sized or submicron sized structures, provides a new insight to the production of value-added nanotechnology by upcycling. Thus, the method according to the present invention enhances environmental sustainability especially in the case where waste plastics are used as the one or more polymers as carbon source.

Up to date, no report is found which refers to the development of graphene or fullerene or other carbon nanostructures on talc by using different waste plastic sources. The nature of talc is very different from clay. The method according to the present invention is different from production of carbon-based submicron- or nano-sized structures by replacing cations in interlayers of montmorillonite with cationic surfactants such as alkyl ammonium. In the present invention, there is no ionic group in the talc additive to be used as an exchanger. In addition, completely pure and charged talc has a hydrophobic surface chemistry, making it difficult to distribute into the polymer matrix. However, when both the surface chemistry and aspect ratio of talc are controlled, it improves the mechanical properties of commodity polymers as a reinforcement. With this invention, the dimension of carbon nanostructures is tailored regarding the polymer sources. For instance, waste polystyrene leads to the formation of fullerenes on talc whereas polyethylene provides to grow graphene sheets on talc surface. Using talc as a substrate creates a surprising impact for growth of carbon-based two-dimensional nano- or submicron-sized structures such as graphene and/or three-dimensional nano- or submicron-sized structures such as fullerene.

The most prominent problem encountered in typical graphene applications is the aggregation of the graphene layers in the polymer matrix and the decrease of the surface area [Wen, Z., Wang, X., Mao, S., Bo, Z., Kim, H., Cui, S., Lu, G., Feng, X., Chen, J. 2012. "Crumpled Nitrogen-Doped Graphene Nanosheets with Ultrahigh Pore Volume for High-Performance Supercapacitor", Advanced Materials, 24, 5610-5616] [An, X., Simmons, T., Shah, R., Wolfe, C., Lewis, K. M., Washington, M., Nayak, S. K., Talapatra, S., Kar, S. 2010. "Stable Aqueous Dispersions of Noncovalently Functionalized Graphene from Graphite and Their Multifunctional High-Performance Applications", Nano Letters, 10 (11), 4295-4301]. Therefore, most of the studies are also carried out on the functionalization of the graphene surface and making it compatible with a respective matrix. With this invention, this hybrid additive can be used directly in the selected matrix as a reinforcement material without necessitating any further surface modification, and the problem of graphene aggregation is eliminated.

As discussed above, waste plastic management is a growing problem. Although recycling of plastics provides several benefits, the performance of the resulting plastic product is not like a virgin one. Instead of traditional recycling processes, the present invention enables the production of highly value-added nanomaterials in an environmentally friendly, sustainable and cost-effective fashion. With the method according to the present invention, plastic wastes as carbon source can be converted into vapor phase and bind to talc surface for growing graphene- or fullerene-like structures under mild conditions by upcycling technology. The resulting hybrid additive provides reinforcement and thermal strength to thermoplastic composites. Talc is used as a template for growth of carbon-based 2D and/or 3D nano-sized or submicron sized structures thanks to its platelet and crystalline structure.

Nowadays, the management of plastic wastes has become a basic and indisputable problem that most of the countries are faced in their industrial and technological activities. All these plastic products contain carbon chains with an abundance of about 62.6-92.2% carbon compound. The existence of carbon chains within polymer seeds attracts attention to the ability of these plastic wastes to get converted into some more valuable materials from carbon families. In other words, solid plastic waste is one of the prominent wastes that can be used as a precursor for the synthesis of graphene nanosheets and other value-added carbon nanostructures, in particular, fullerene. The waste plastics can therefore provide a carbon source for carbon-based value-added products.

Graphene or carbon nanotube studies that have been carried out on clay and modified clay with the upcycling process only verify the formation of carbon structures on different templates.

The present invention achieves the following objects:

- elimination of the drawbacks in the prior art;
- provision of a method to obtain such hybrid additive;
- tailoring the control of dimension of carbon structures regarding the type of polymer source and the size of talc substrate;
- provision of a low-cost and mild process for obtaining carbon-based two-dimensional and/or three-dimensional nano- or submicron-sized structures;
- enabling a low-density hybrid additive which provides a high mechanical strength to composites when introduced as a reinforcement material.

What is claimed is:

1. A method for obtaining carbon-based two-dimensional and/or three-dimensional nano- or submicron-sized structures, comprising the following consecutive steps:

a) arranging a talc to have a $D_{50}$ particle size of up to 10 micrometers, or within the range between 2 and 10 micrometers, or up to 2 micrometers; then activating a surface of the talc, thereby obtaining talc with an activated surface;

b) bringing the activated surface into contact with one or more polymers;

c) pyrolysis and/or carbonization of the polymers when in contact with the activated surface; wherein in the step a, the surface of the talc is activated with an activator selected from the list consisting of carboxylic acids, metal salts and metal oxides.

2. The method according to claim 1, wherein in the step a, the surface of the talc is activated with an activator selected from metal salts and metal oxides.

3. The method according to claim 1, wherein the one or more polymers include aromatic rings.

4. The method according to claim 3, wherein the one or more polymers are selected from a list consisting of polystyrene, polyethylene terephthalate, polyethersulphone, polyether ketone, polyether ether ketone, polyphenylenes and mixtures thereof, for obtaining carbon-based three-dimensional nano- or submicron-sized structures on talc.

5. The method according to claim 1, wherein the one or more polymers are selected from a list consisting of polypropylene, polyethylene, non-aromatic polyamides, polylactide, polyglycolide and poly(ε-caprolactone) or polycaprolactone and mixtures thereof, for obtaining carbon-based two-dimensional nano- or submicron-sized structures on talc.

6. The method according to claim 1, wherein the one or more polymers are obtained from plastic wastes.

7. The method according to claim 1, wherein the pyrolysis and/or carbonization in the step c is performed at a pyrolysis and/or carbonization temperature of at least 850° C., preferably the pyrolysis and/or carbonization temperature is at least 1000° C.

8. The method according to claim 7, wherein a temperature ramp rate of at least 10° C. per minute is applied to reach the pyrolysis and/or carbonization temperature.

9. The method according to claim 1, wherein the talc is arranged to have a $D_{50}$ particle size of up to 10 micrometers.

10. The method according to claim 1, wherein the talc is arranged to have a $D_{50}$ particle size within the range between 2 micrometers and 10 micrometers, for obtaining carbon-based two- and three-dimensional nano- or submicron-sized structures on talc.

11. The method according to claim 1, wherein the talc is arranged to have a $D_{50}$ particle size of up to 2 micrometers, for increasing the selectivity of carbon-based three-dimensional nano- or submicron-sized structures on talc.

12. The method according to claim 1, wherein said one or more polymers have a carbon atom content of 65 wt. % or higher based on the total weight of said one or more polymers.

13. The method according to claim 1, wherein in the step (b) the bringing the activated surface into contact with one or more polymers is performed via a mixing selected from solution mixing or melt mixing.

14. The method according to claim 2, wherein in the step a, the surface of the talc is activated with an activator selected from metal oxides.

15. The method according to claim 12, wherein said one or more polymers have a carbon atom content of 80 wt. % or higher based on the total weight of said one or more polymers.

16. The method according to claim 12, wherein said one or more polymers have a carbon atom content of 85 wt. % or higher based on the total weight of said one or more polymers.

17. The method according to claim 1, wherein in the step (b) the bringing the activated surface into contact with one or more polymers is performed via extrusion or via high shear melt mixing.

18. The method according to claim 2, wherein the one or more polymers include aromatic rings.

19. The method according to claim 18, wherein the one or more polymers are selected from a list consisting of polystyrene, polyethylene terephthalate, polyethersulphone, polyether ketone, polyether ether ketone, polyphenylenes and mixtures thereof, for obtaining carbon-based three-dimensional nano- or submicron-sized structures on talc.

* * * * *